(12) United States Patent
Chou

(10) Patent No.: US 6,290,353 B1
(45) Date of Patent: Sep. 18, 2001

(54) SPECTACLES

(75) Inventor: Shen-Kuei Chou, Taipei (TW)

(73) Assignee: Evergreat Optical Ind. Co., LTD, Taipei (TW)

( * ) Notice: Subject to any disclaimer, the term of this patent is extended or adjusted under 35 U.S.C. 154(b) by 0 days.

(21) Appl. No.: 09/635,215

(22) Filed: Aug. 10, 2000

(30) Foreign Application Priority Data

Mar. 21, 2000 (TW) .............................................. 089204510

(51) Int. Cl.⁷ ...................................................... G02B 9/00
(52) U.S. Cl. ............................................... 351/47; 351/57
(58) Field of Search ................................. 351/47, 57, 48, 351/58, 44, 41

(56) References Cited

U.S. PATENT DOCUMENTS 5,883,688 * 3/1999 Chao .................................. 351/47
6,113,235 * 9/2000 Yamamoto ............................. 351/47
6,116,732 * 9/2000 Xiao ...................................... 351/47

\* cited by examiner

Primary Examiner—Hung Xuan Dang
(74) Attorney, Agent, or Firm—Intellectual Property Solutions, PLLC.

(57) ABSTRACT

A pair of spectacles comprising a frame and a pair of matching click-on lenses is provided such that two spaced-apart positioning portions are attached to the corresponding end pieces of the frame. According to an embodiment of the present invention, the positioning portions are comprised of C-shaped metal wires fixedly attached to the end pieces of the frame, or the positioning portions are comprised of C-shaped metal wires each having two torsional ends to be pivotally attached to the end pieces of the frame. According to another embodiment of the present invention, the positioning portions are each comprised of a recess having an opening pointing towards each other. The clip-on lenses therefore can be quickly and securely connected to the frame by the two positioning portions and by clamping to the bridge of the frame.

2 Claims, 10 Drawing Sheets

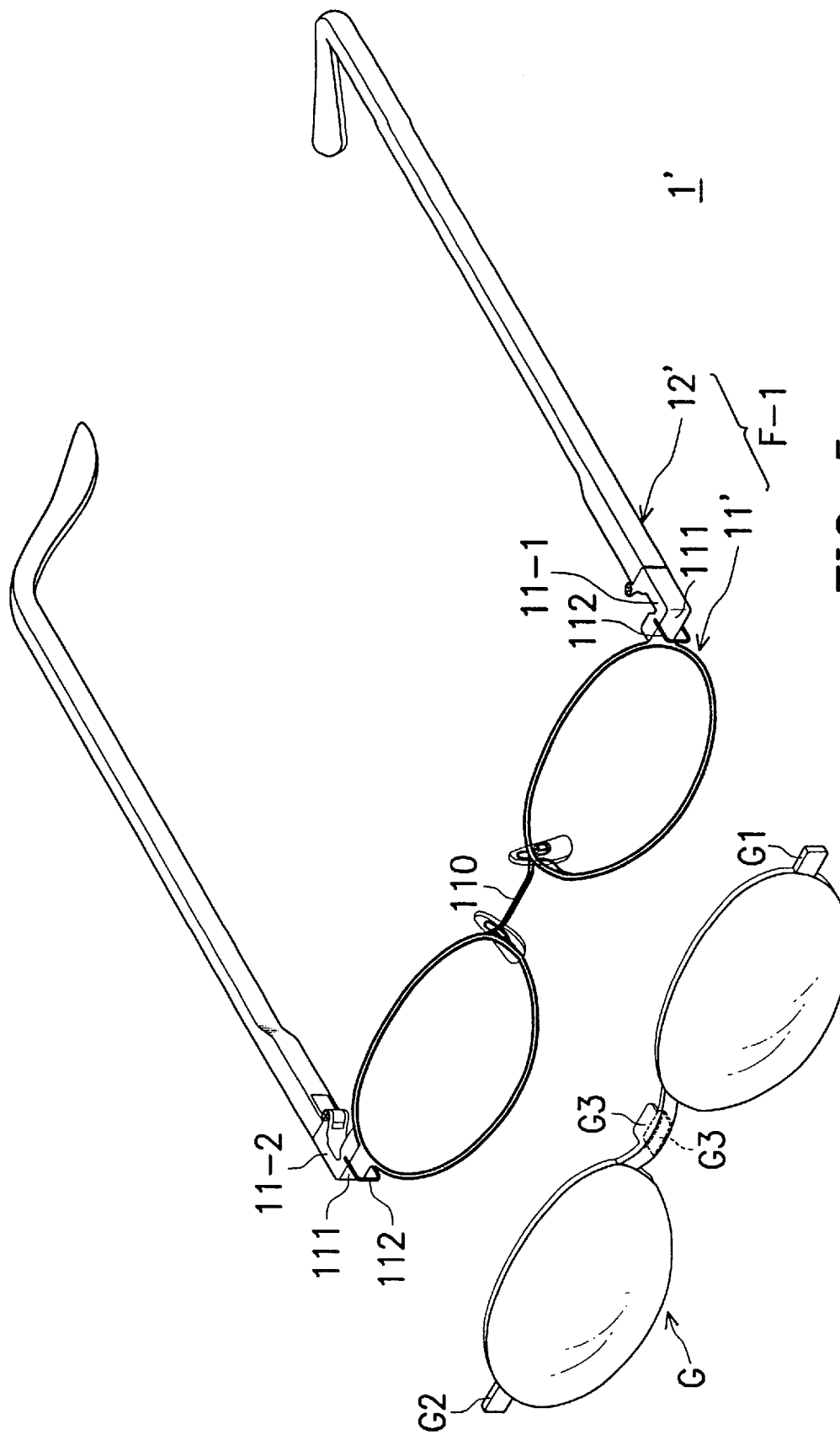

//-
SPECTACLES

BACKGROUND OF THE INVENTION

1. Field of the Invention

The present invention relates to spectacles commonly known as eyeglasses. More particularly, the invention relates to spectacles which are provided with two spaced-apart positioning portions located on the end pieces so as to securely attach matching clip-on lenses to the spectacles by means of the positioning portions.

2. Description of Prior Art

In the conventional sunglasses or spectacles, it is common to use permanent magnets or spring-loaded clips (not shown) as connectors for securely attaching a pair of clip-on sunglass lenses to the frame of the spectacles.

However, owing to the limited adhesive force typically found in the permanent magnets as well as in the spring-loaded clips, it is easy for the clip-on lenses to slip off the frame of the spectacles whenever the user is engaged in violent motions.

SUMMARY OF THE INVENTION

In view of the above-described disadvantage, it is a primary object of the present invention to provide spectacles to which matching clip-on lenses can be easily and securely attached. The spectacles according to the present invention comprise at least a frame, two first positioning portions on the frame, a pair of clip-on lenses, and two second positioning portions on the clip-on lenses. Wherein, the frame is provided with two spaced-apart end pieces and a bridge situated in between the end pieces. The two first positioning portions are each pivotally mounted on a respective end piece of the frame. The clip-on lenses are provided with a center connecting portion for connecting to the bridge of the frame and two spaced-apart second positioning portions for connecting to the two first positioning portions of the frame.

BRIEF DESCRIPTION OF THE DRAWINGS

The present invention can be more fully understood by reading the subsequent detailed description and examples with reference made to accompanying drawings in which:

FIG. 5 is a perspective view depicting the exploded structure of a pair of spectacles (1') according to a fourth embodiment of the present invention.

DETAILED DESCRIPTION OF THE PREFERRED EMBODIMENTS

First Embodiment

Figure 1A:
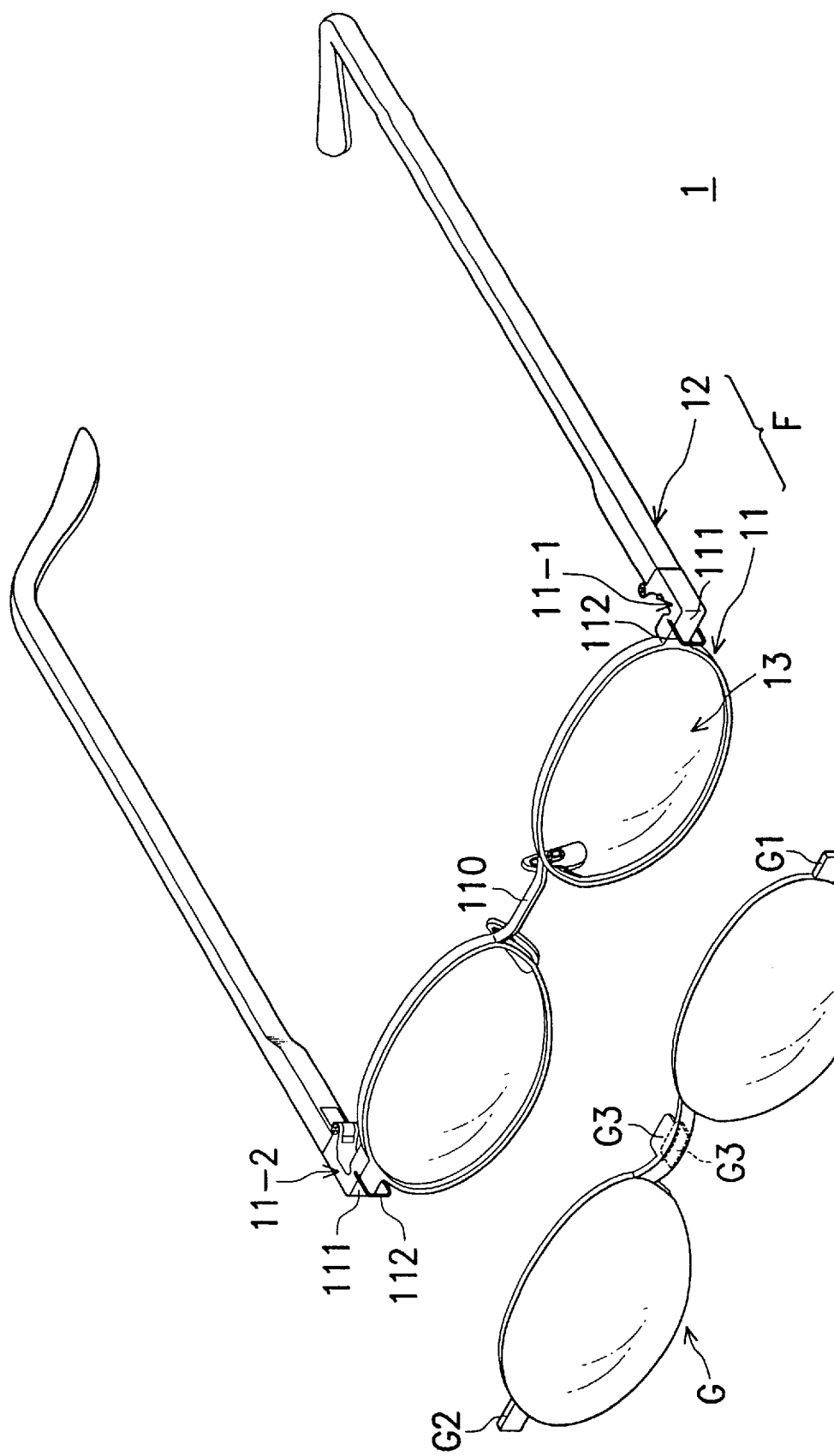
FIG. 1A is a perspective view depicting the exploded structure of a pair of spectacles (1) according to a first embodiment of the present invention.

Referring to FIG. 1A, FIG. 1A is a perspective view depicting the exploded structure of a pair of spectacles 1 according to a first embodiment of the present invention.

The spectacles 1 according to the first embodiment are comprised of a frame F and a pair of clip-on lenses G. The frame F comprises two spaced-apart rims 11(11) fixedly connected by a bridge 110 positioned between said rims 11(11), two end pieces 11-1(11-2) each fixedly attached to a corresponding rim 11 of the frame F, and two temples 12(12) each pivotally connected to a corresponding end piece 11-1(11-2). In addition, two lenses 13(13) are respectively mounted inside the rims 11(11), and two first positioning portions 112(112) are respectively attached to the end pieces 11-1(11-2) which are disposed symmetrically with respect to the bridge 110. Each of the two first positioning portions 112(112) is comprised of an C-shaped metal wire fixedly attached to the corresponding end piece 11-1(11-2) by welding the free ends (not shown) of the C-shaped metal wire into connecting a surface 111 of said end piece 11-1 (11-2) to thereby form a rectangular loop protruding forwardly.

The clip-on lenses G, which are substantially made of polycarbonate (PC) characterized by tinted and transparent features, are detachable lenses for temporarily converting a pair of ordinary eyeglasses into a pair of sunglasses by attaching the clip-on lenses G to the frame F of the spectacles 1 in an overlapping position above the lenses 13(13). The clip-on lenses G are provided with two spaced-apart second positioning portions G1(G2) and a connecting portion G3, wherein the connecting portion G3 is located in between the second positioning portions G1(G2).

Figure 1B:
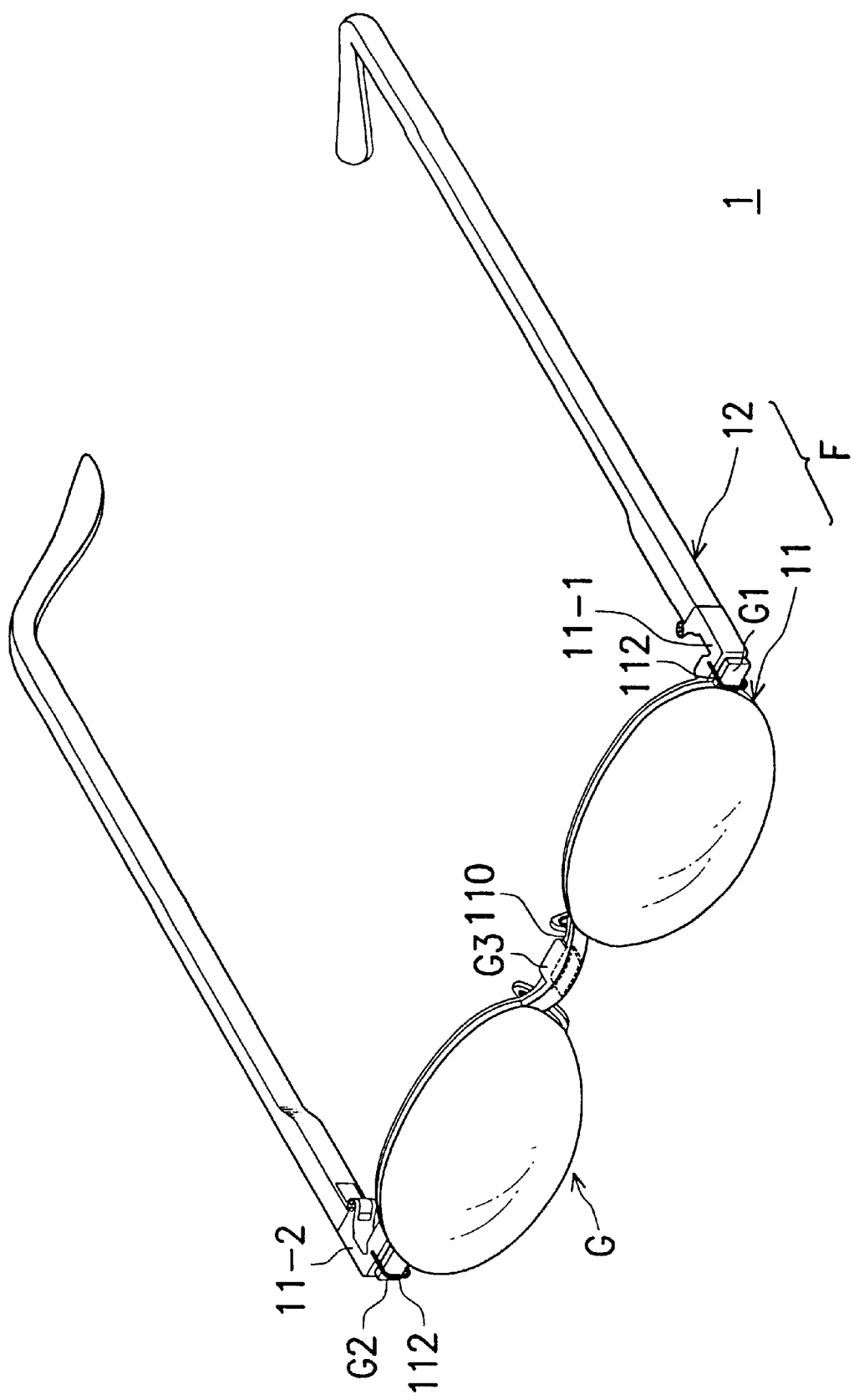
FIG. 1B is a perspective view of the spectacles (1) shown in FIG. 1A in an assembled position according to the first embodiment of the present invention.

Referring to FIG. 1B, FIG. 1B is a perspective view of the clip-on lenses G shown in FIG. 1A in an assembled position on the frame F according to the first embodiment of the present invention. The clip-on lenses G are quickly and securely attached to the frame F of the spectacles 1 by correspondingly inserting the second positioning portions G1(G2) into the rectangular loops formed by the first positioning portions 112(112) and then by clamping the connecting portion G3 on the bridge 110.

Second Embodiment

Figure 2A:
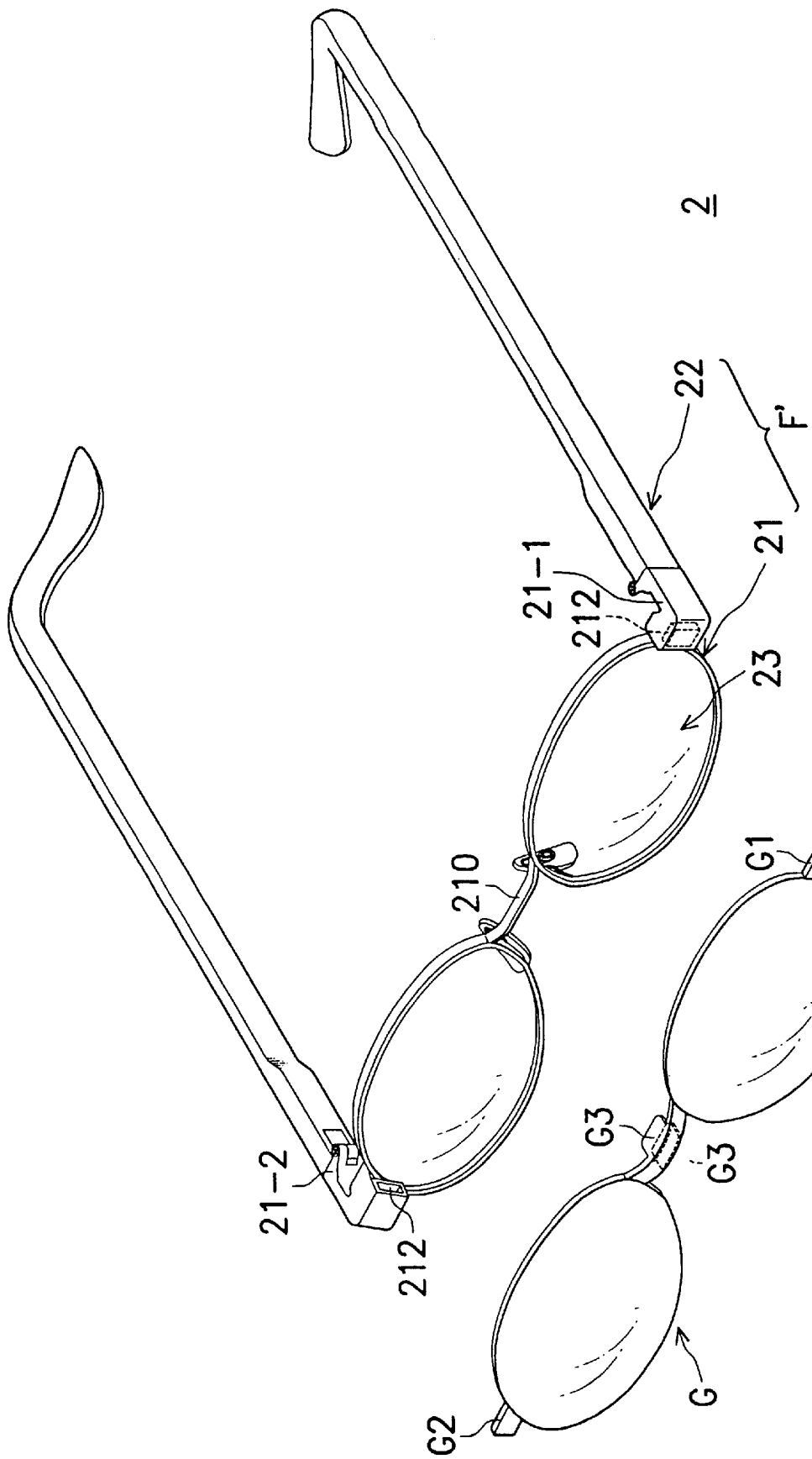
FIG. 2A is a perspective view depicting the exploded structure of a pair of spectacles (2) according to a second embodiment of the present invention.

Referring to FIG. 2A, FIG. 2A is a perspective view depicting the exploded structure of a pair of spectacles 2 according to a second embodiment of the present invention.

The spectacles 2 according to the second embodiment are comprised of a frame F' and a pair of the same clip-on lenses G as described in the first embodiment. The frame F' comprises two spaced-apart rims 21(21) fixedly connected by a bridge 210 positioned between said rims 21(21), two spaced-apart end pieces 21-1(21-2) each fixedly attached to a corresponding rim 21 of the frame F', two temples 22(22) each pivotally connected to a corresponding end piece 21-1(21-2), and two lenses 23(23) respectively mounted inside the rims 21(21). Furthermore, two first positioning portions 212(212) are provided on the end pieces 21-1(21-2), respectively, in opposing positions. Each of the two first positioning portions 212(212) is comprised of a recess formed into a surface of the corresponding end piece 21-1 (21-2) that opposes to the other end piece 21-2(21-1).

Figure 2B:
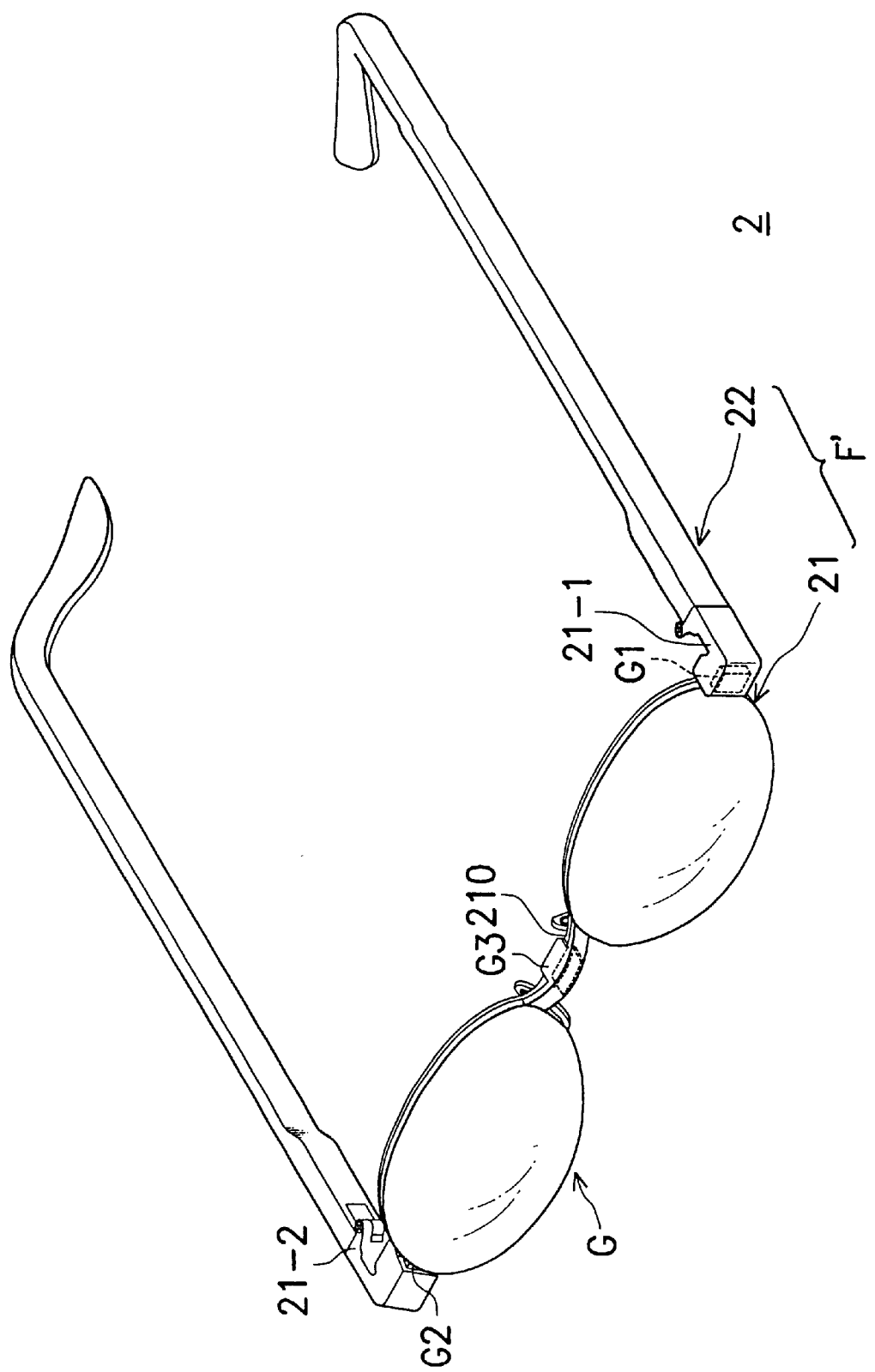
FIG. 2B is a perspective view of the spectacles (2) shown in FIG. 2A in an assembled position according to the second embodiment of the present invention.

Referring to FIG. 2B, FIG. 2B is a perspective view of the clip-on lenses G shown in FIG. 2A in a mounted position on the frame F' according to the second embodiment of the present invention. The clip-on lenses G are quickly and securely attached to the frame F' of the spectacle 2 by correspondingly inserting the two second positioning portions G1(G2) into the recesses of two opposing first positioning portions 112, 112 and then by clamping the connecting portion G3 on the bridge 210.

Third Embodiment

Figure 3A:
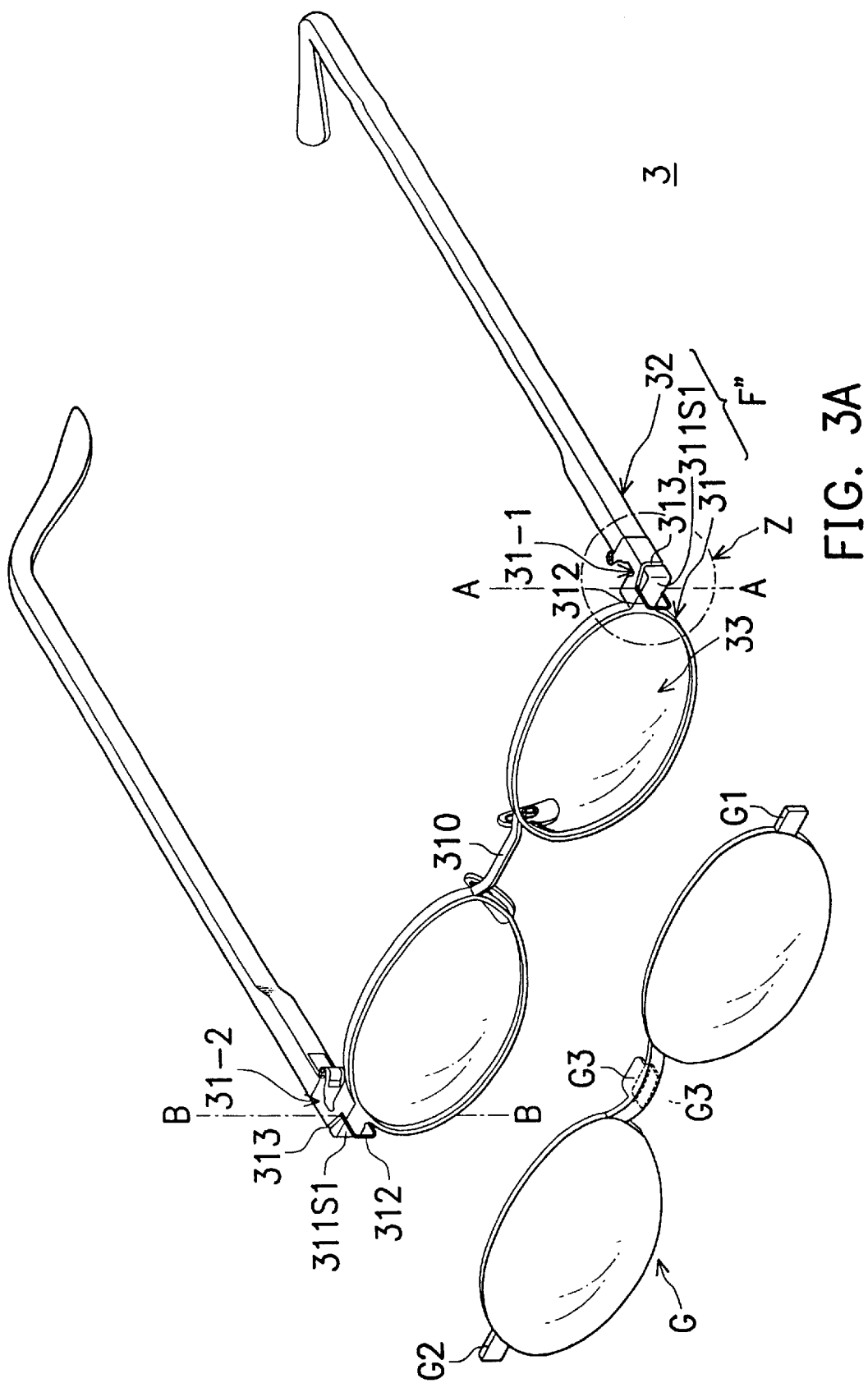
FIG. 3A is a perspective view depicting the exploded structure of a pair of spectacles (3) according to a third embodiment of the present invention.

Referring to FIG. 3A, FIG. 3A is a perspective view depicting the exploded structure of a pair of spectacles 3 according to a third embodiment of the present invention.

Figure 3B:
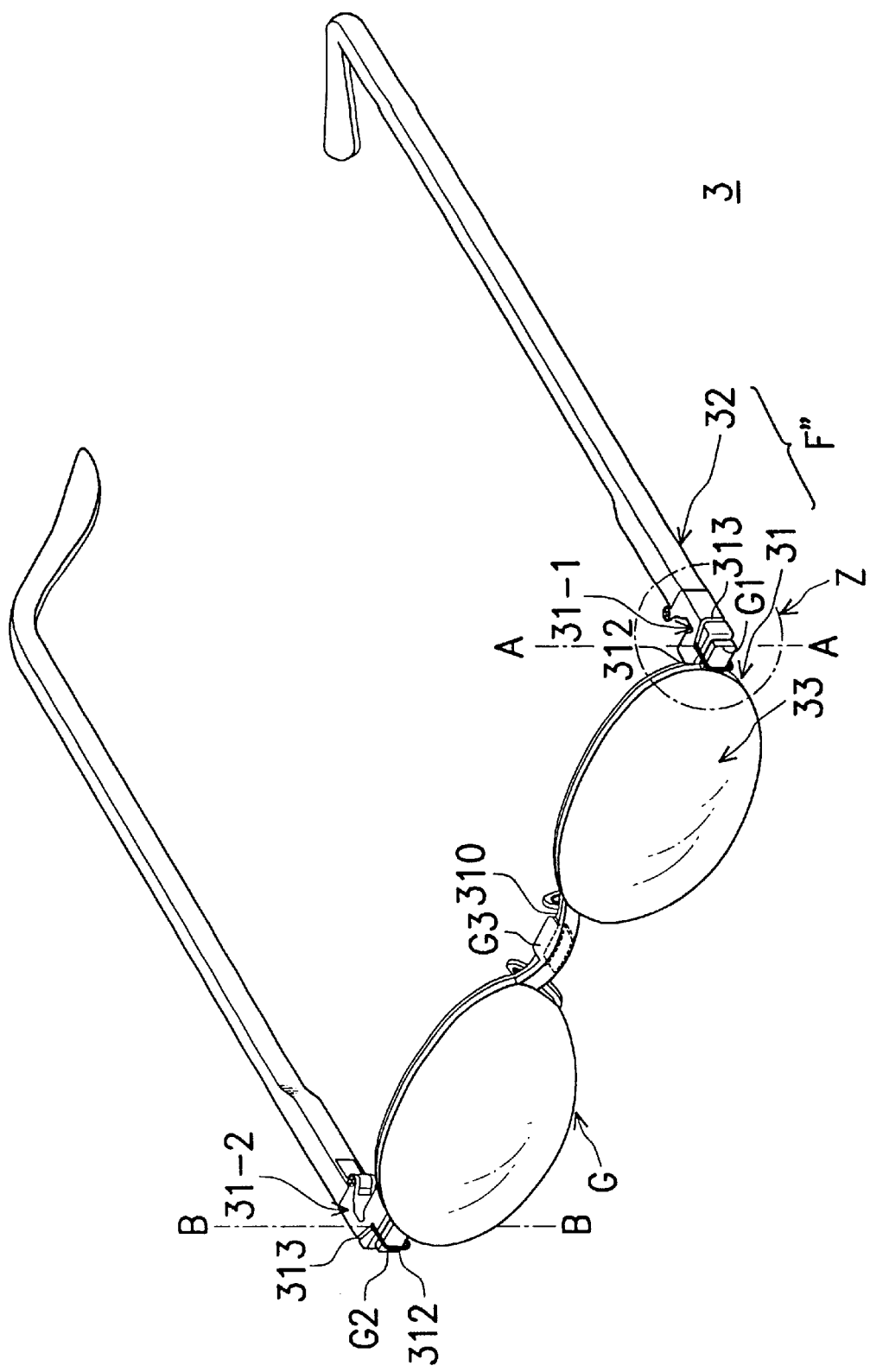
FIG. 3B is a perspective view of the spectacles (3) shown in FIG. 3A in an assembled position according to the third embodiment of the present invention.
Figure 3C:
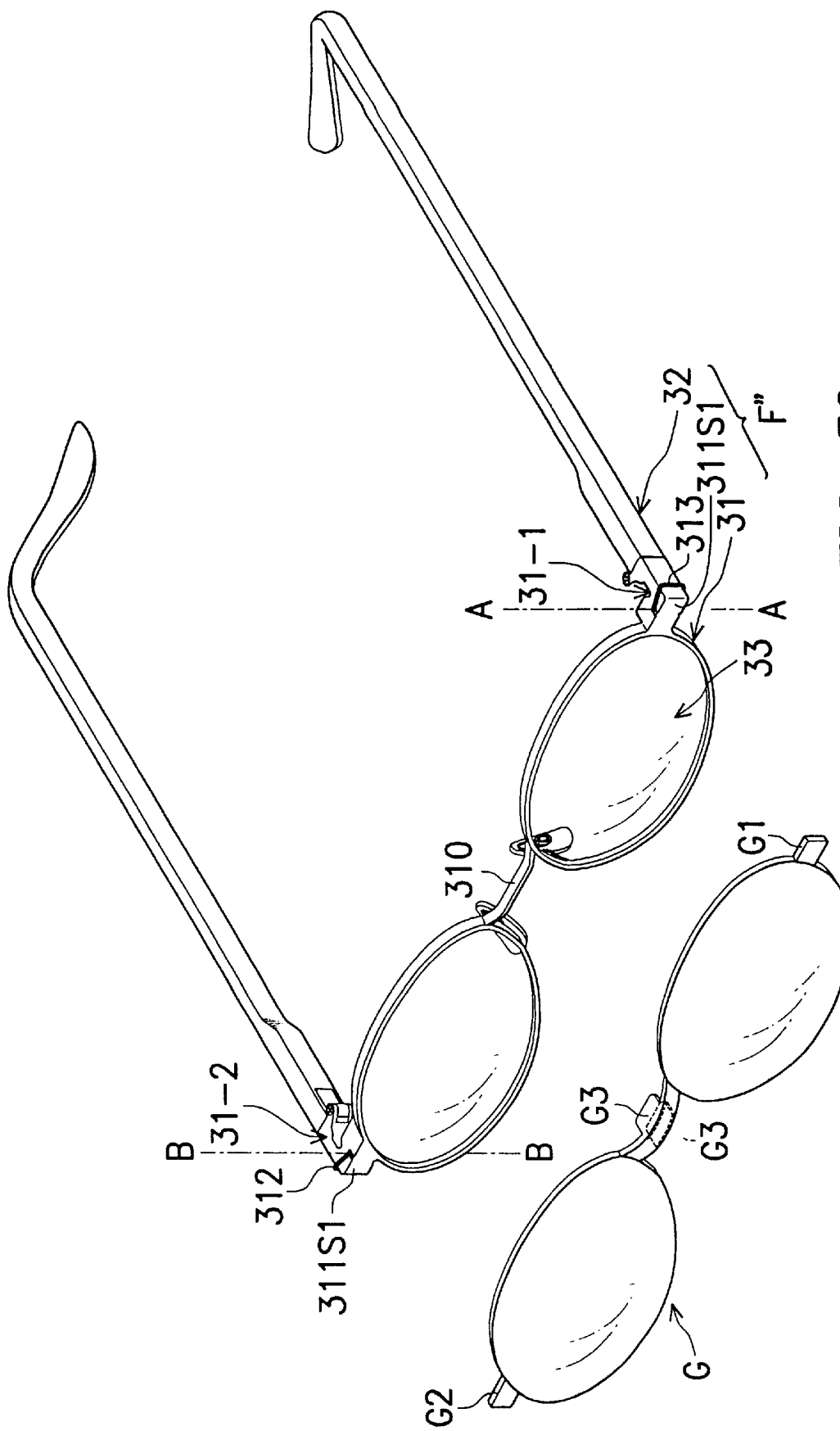
FIG. 3C shows another perspective view of the same spectacles (3) shown in FIG. 3B in a stowing position.

The spectacles 3 according to the third embodiment are comprised of a frame F''' and a pair of the same clip-on lenses G as described in the first and the second embodiments. The frame F''' comprises two spaced-apart rims 31(31) fixedly connected by a bridge 310 positioned between said rims 31(31), two spaced-apart end pieces 31-1(31-2) each fixedly attached to a corresponding rim 31 of the frame F''', two temples 32(32) each pivotally connected to a corresponding end pieces 31-1(31-2), and two lenses 33(33) respectively mounted inside the rims 31(31). Furthermore, two first positioning portions 312(312) made of metal wires are pivotally mounted on the end pieces 31-1(31-2), and a continual grooves 313 is formed on each of the end pieces 31-1(31-2) for stowing the first positioning portions 312(312), respectively. As shown in FIGS. 3A, 3B, and 3C, each of the two first positioning portions 312(312) is adaptable between a receiving position and a stowing position where in the receiving position the first positioning portion 312(312) is extended forwardly in perpendicular to the surface 311S1(311S1) of the end piece 31-1(31-2) and in the stowing position the first positioning portions 312(312) are retracted into the grooves 313(313).

Figure 4A:
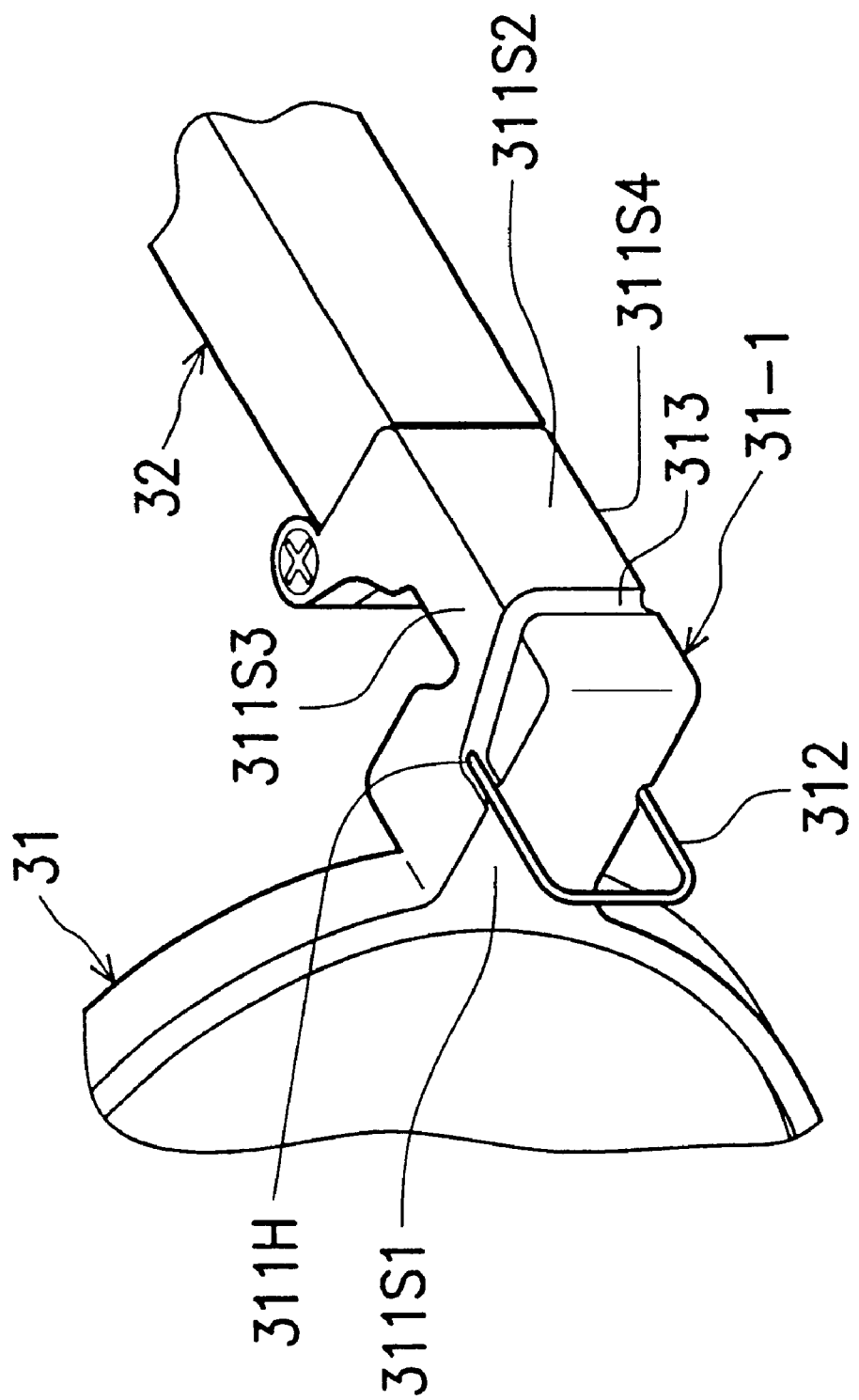
FIG. 4A shows another perspective view of the spectacles (3) shown in FIG. 3A where an area encircled by a dotted line (Z) is enlarged.
Figure 4B:
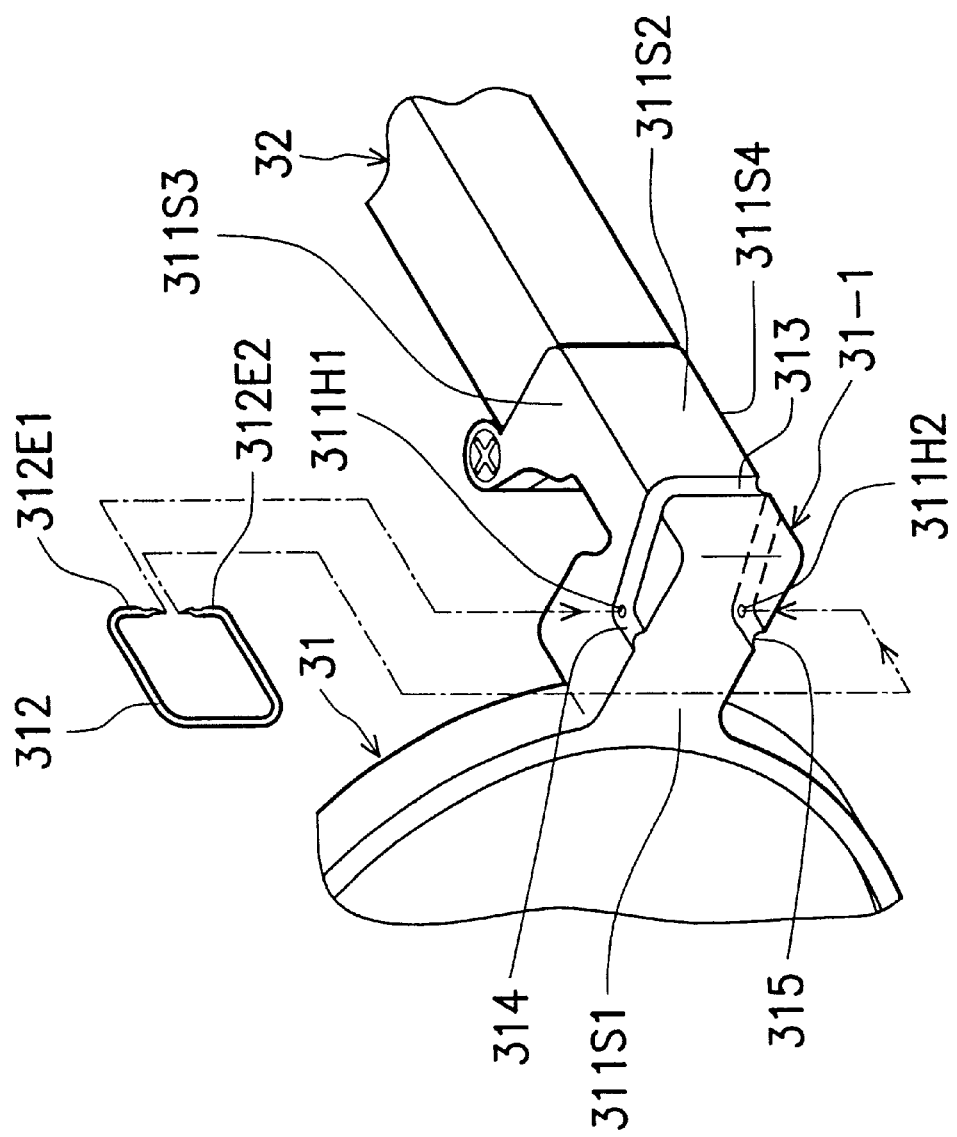
FIG. 4B shows an assembly view of the same spectacles (3) shown in FIG. 4A.

Referring now to FIG. 4A and FIG. 4B, FIG. 4A shows another perspective view of the spectacles 3 shown in FIG. 3A where an area encircled by a dotted line Z is enlarged, and FIG. 4B shows an assembly view of the same first positioning portion 312 shown in FIG. 4A detached from the spectacles 3.

As shown in FIG. 4A and FIG. 4B, the end piece 31-1 is an intermediate element having four surfaces 311S1, 311S2, 311S3, 311S4, such that a continual groove 311 is formed continuously on the surfaces 311S2, 311S3, 311S4. As shown in FIG. 4B, two holes 311H1,311H2 facing opposite directions are formed on the surfaces 311S3, 311S4, respectively, and located inside the groove 313. The first positioning portion 312 is a C-shaped metal wire provided with two torsional ends 312E1, 312E2 which are receivable in the holes 311H1, 311H2, respectively. The first positioning portion 312 is pivotally connected to the end piece 31-1 so as to be rotatable about an axis A—A (as shown in FIG. 3A) by inserting the two torsion ends 312E1(312E2) into the two holes 311H1(311H2), respectively.

With the groove 313 formed on the surfaces 311S2, 311S3, 311S4, as shown in FIG. 3B, the first positioning portion 312 is positioned perpendicular to the surface 311S1 of the end piece 31-1 in the receiving position for retaining the clip-on lenses G. In the stowing position, on the other hand, the clip-on lenses G are first removed from the frame F''' by slightly warping the clip-on lenses G, then the first positioning portion 312 is rotated about the axis A—A toward the groove 313 so that the first positioning portion 312 is eventually received in the groove 313, as shown in FIG. 3C. Furthermore, both the torsion ends 312E1(312E2) of the first positioning portion 312 situated in the groove 313, as shown in FIG. 3C, are applied an internal torsional stress as the first positioning portions 312(312) are twisted while being rotated from the receiving position to the stowing position. Once the first positioning portions 312(312) are skipped from the limitation of the grooves 313(313) by such an initial triggering as the prying stroke of a fingernail, the first positioning portions 312(312) can be quickly released from the confinement of the groove 313(313) to be erected to the receiving position, as shown in FIG. 3A, by the internally generated torsional stress of the twisted torsion ends 312E1(312E2).

Fourth Embodiment

Referring to FIG. 5, FIG. 5 is a perspective view depicting the exploded structure of a pair of spectacles 1' according to a fourth embodiment of the present invention.

In comparison with the first embodiment of the present invention as shown in FIG. 1, the rims 11'(11') of the frame F-1 shown in FIG. 5 are not used for mounting any lens. That is to say, the spectacles 1' are designed to be without any lens. Moreover, the steps for attaching the clip-on lenses G to the frame F-1 are the same as the steps for attaching the clip-on lenses G to the frame F according to the first embodiment of the present invention.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A pair of spectacles, comprising:
   a frame having two spaced-apart rims for retaining a pair of lenses, a bridge disposed between the rims, and two end pieces each fixedly attached to a corresponding rim;
   two first positioning portions each pivotally mounted on a corresponding end piece; and
   a pair of clip-on lenses having a connecting portion for attaching to the bridge and two spaced-apart second positioning portions for attaching to the first positioning portions correspondingly,
   wherein said first positioning portions are made from shaped metal wires such that each first positioning portion is provided with two torsion ends.

2. A pair of spectacles, comprising:
   a frame having two spaced-apart rims for retaining a pair of lenses, a bridge disposed between the rims, and two end pieces each fixedly attached to a corresponding rim;
   two first positioning portions each pivotally mounted on a corresponding end piece; and
   a pair of clip-on lenses having a connecting portion for attaching to the bridge and two spaced-apart second positioning portions for attaching to the first positioning portions correspondingly,
   wherein said first positioning portions are made from shaped metal wires such that each first positioning portion is provided with two torsion ends,
   wherein said connecting portion and said second positioning portions are integrally formed on said clip-on lenses.

* * * * *